US00RE34396E

United States Patent [19]

Wollenhaupt

[11] E Patent Number: Re. 34,396

[45] Reissued Date of Patent: Oct. 5, 1993

[54] SAFETY INTERLOCK SWITCHING DEVICE FOR PROTECTING EQUIPMENT

[75] Inventor: Jakob Wollenhaupt, Cologne, Fed. Rep. of Germany

[73] Assignee: Helmut Letzel, Cologne, Fed. Rep. of Germany

[21] Appl. No.: 531,916

[22] Filed: May 29, 1990

Related U.S. Patent Documents

Reissue of:

[64] Patent No.: 4,659,884
Issued: Apr. 21, 1987
Appl. No.: 766,817
Filed: Aug. 16, 1985

[30] Foreign Application Priority Data

Aug. 16, 1984 [EP] European Pat. Off. ..... 84109757

[51] Int. Cl.[5] ..... H01H 3/00; H01H 9/20; B04B 7/06

[52] U.S. Cl. ..... 200/50 R; 335/160; 335/170; 335/191; 192/135

[58] Field of Search ..... 200/50 R, 52 R, 50 A, 200/61.58 R, 61.61, 61.62, 61.64; 335/159-161, 170, 185, 189, 191; 192/135, 136

[56] References Cited

U.S. PATENT DOCUMENTS

| | | | |
|---|---|---|---|
| 3,627,960 | 12/1971 | Grabek | 200/61.64 |
| 3,855,432 | 12/1974 | Kelly et al. | 200/61.62 X |
| 3,915,273 | 10/1975 | Loschengruber | 192/135 |
| 4,101,745 | 7/1978 | Smith | 200/61.62 X |

*Primary Examiner*—J. R. Scott
*Attorney, Agent, or Firm*—Karl Hormann

[57] ABSTRACT

A safety interlock switching device for protecting equipment, which assures the switching-off of the dangerous operating condition in the opened position of the protecting equipment, and comprises a housing, a toggle lever provided with a pivotably mounted locking lever which has two dead center points and has a cam surface which cooperates with a respective cam surface of an actuating element rigidly mounted on the protective hood and insertable into the housing. A switch is provided which actuates the toggle lever. The toggle lever and the switch are positioned in the housing of the switching device. The housing has an insertion opening into which the actuating element is insertable. In one dead center position of the toggle lever, the locking lever and the actuating element interlock with each other, and in the other dead center position the dangerous operating condition is switched off by the switch, and the actuating element with the protective hood are released.

19 Claims, 10 Drawing Sheets

SAFETY INTERLOCK SWITCHING DEVICE FOR PROTECTING EQUIPMENT

Matter enclosed in heavy brackets [ ] appears in the original patent but forms no part of this reissue specification; matter printed in italics indicates the additions made by reissue.

BACKGROUND OF THE INVENTION

The invention relates to a device for a safety interlocking in protection equipment for preventing reaching into spaces which are dangerous, in particular in accordance with dangerous movements or in current conducting equipment in housings, whereby the given protection equipment is in a protective position during the dangerous operating condition and is locked; however, it can be opened during the non-dangerous operating condition.

In machines with movements which are dangerous, current conducting housings, for example, switchboards, are subject to strict legal regulations, so as to protect human beings operating the same. The safety technical requirements for such safety interlocking devices are compiled in the DIN-prestandard 31.001. Therein, exemplified solutions are stated, whereby the following goal of protection is obtained. As long as the protection device is not in its protective position, the dangerous operating condition should not be switched on.

In all previously known solutions as well as in the commercially available embodiments one starts from the principle to make the dangerous movement safe by means of electrical switches. They may be designed as a circuit opener or a circuit closer. Until now, two different embodiments has been known in addition to exclusively electrical safety devices. The one embodiment represents an interlocking under a current. The protection device, for example, a protective hood or a sliding door is interlocked by means of a bolt or a slide which is actuated by a magnet and is kept under current in the locking position. The other embodiment represents an interlocking device operated by means of a spring pressure. Thereby, a locking bolt or a slide is brought into the interlocking position by means of a spring and is held in that position by the spring pressure. The opening is performed by a magnet which is dimensioned such that is sufficiently overcomes the force of the spring. Both embodiments behave different during a power failure. In the first mentioned embodiment with an interlocking under current, the interlocking device automatically opens due to the power failure, because the magnet is pushed back into its initial position by its return spring. The protective hood, or the door can then be opened. If due to power failure the magnet is pushed back and the door opens too rapidly accidents cannot be excluded during a rash. In order to prevent such accidents, an additional time delay, preferably of the mechanical type, would be required, which naturally would result in a considerable structural expenditure, without assuring a real reliability. In the second known embodiment, namely the interlocking by means of a spring pressure, the opening by the magnet during power failure is not possible. One has to manually push back the spring in any kind of a skillfull manner, so as to enable the opening of the protective hood or the door. However, this would also be possible during the dangerous movement. Thus, the protection device would be ineffective.

SUMMARY OF THE INVENTION

It is an object of the invention to provide a device for safety interlocking, wherein in the closed condition of the protection device a complete forced mechanical interlocking is assured, on the one hand, and in the opened position of the protection device the switching off of the dangerous opening conditions is ensured, on the other hand.

The object of the invention is solved in accordance with the invention in that a toggle lever is provided with a pivoted locking lever which has two dead center positions cooperating with an actuating part stationary mounted on the protection device and provided with a locking cam in such a manner that in the one dead center position of the toggle lever, the locking lever and the actuating part interlock with each other and the dangerous operating condition may be switched on, and that in the other dead center position, the dangerous operating condition is switched off thus releasing the actuating part and the protection device.

DETAILED DESCRIPTION OF THE PREFERRED EMBODIMENTS

Figure 1:
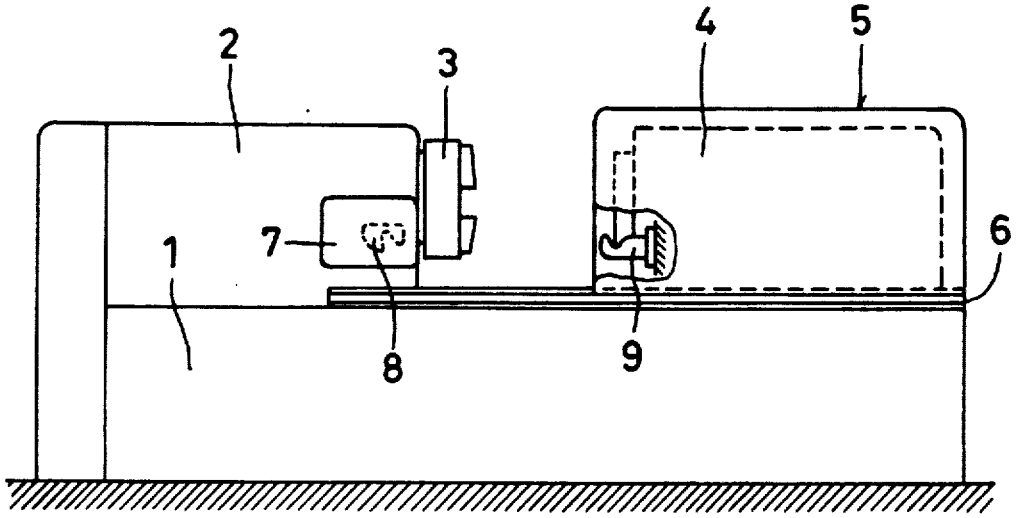
FIG. 1 is a side view of a turning machine with an opened protection device.
Figure 2:
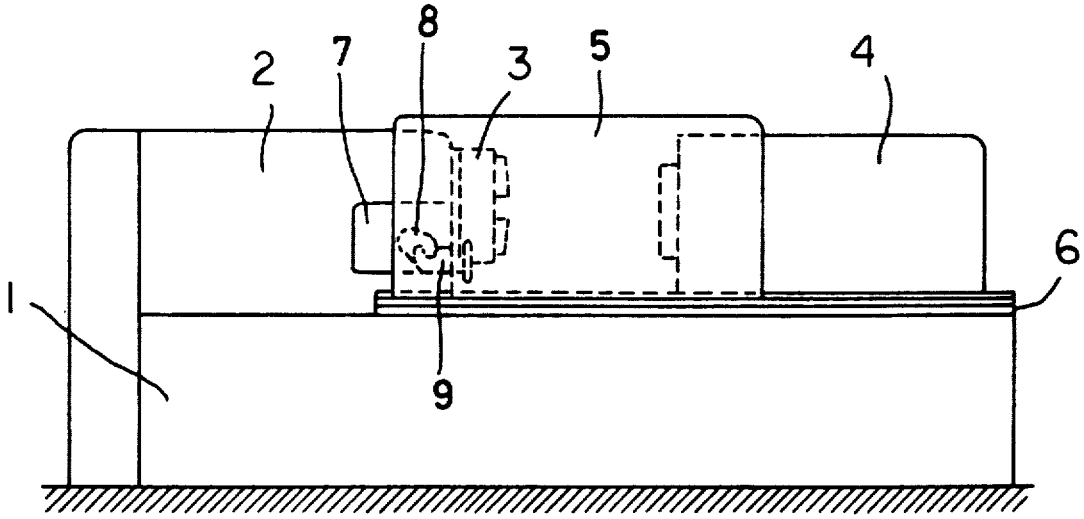
FIG. 2 is a side view in accordance with FIG. 1, with closed protection device.

A turning machine in a schematic illustration is shown in FIGS. 1 and 2.

Figure 3:
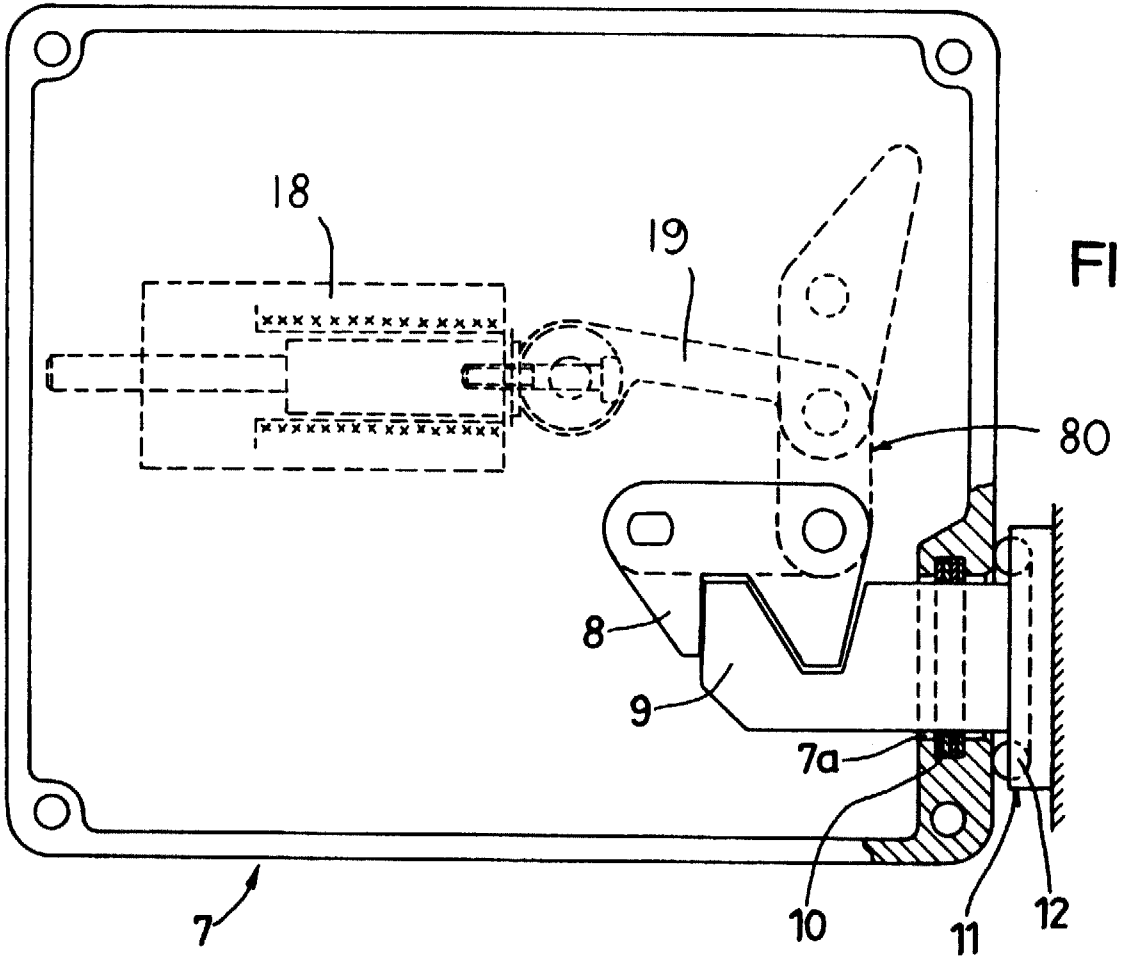
FIG. 3 is a detail from FIG. 2, however at an enlarged scale, namely the safety interlocking device in a locked position.

At the left side of FIG. 1 a headstock 2 with the drive and the operating spindle as well as the geared scroll lathe chucks 3 are mounted on bench 1. On the right side of FIG. 1, there is a tailstock or turrethead support 4 which is covered by a protective hood 5, which in this exemplified embodiment constitutes the protection device. This protective hood 5 can be moved on guide tracks 6 slidingly or in a rolling manner towards the direction of the headstock 2. In this exemplified embodiment the housing 7 of the device for the safety interlocking device, which will be explained in more detail below, is mounted on the headstock 2, whereby a locking lever 8 is provided, which must be actuated in accordance with the following description. An actuating part 9 cooperates with the locking lever 8 which is provided with a locking cam surface which cooperates with a respective locking cam surface of actuating part 9, as shown in FIG. 3. Lever 8 is mounted in the protection device 5 by means of a flange. For clarification sake the housing 7, the locking lever 8 and the actuating part 9 are illustrated on an enlarged scale in the drawing. However, in relationship to the turning machine they are actually smaller in reality.

FIG. 2 illustrates the turning machine in accordance with FIG. 1 with closed protection hood 5 in the operating position. In this operating position the locking lever 8 and the actuating part 9 are brought into engagement with each other by a forward sliding of the protective hood and thereby have caused the pure dead center position of the toggle lever within housing 7, whose purpose and effect is explained in conjunction with the FIGS. 3 to 9.

FIG. 3 illustrates the housing 7 with the opened or removed lid. For clarity sake, the locking lever 8 and the actuating part 9 which is provided with a closing cam are illustrated in full lines, that is, in a closed or interlocked condition with forwardly displaced protective hood 5 in accordance with FIG. 2, while a toggle lever system is illustrated in a dash line. The housing 7 is provided with an inlet opening 7a for the actuating part 9 mounted at the front face facing the protective hood, that is, vertically with respect to the drawing plane of FIG. 3. The inlet opening 7a is surrounded by a wipe off packing 10 which acts to clean the actuacting part 9 from shavings or other particles which may cling to the actuating part. The actuating part 9 is rigidly connected with the protective hood 5 by means of a flange 11. This flange is provided with a recess in which a packing 12 which in the closed, interlocked condition in accordance with FIG. 3, i.e., in the operating position of the machine, engages on the mentioned front face of housing 7 preventing the penetration of water, oil, shavings and the like into the housing 7. In accordance with the illustration of FIG. 3 the toggle lever system is in the one dead center position, wherein the operating current for the machine is released, as will be explained in more detail in the following.

Figure 4:
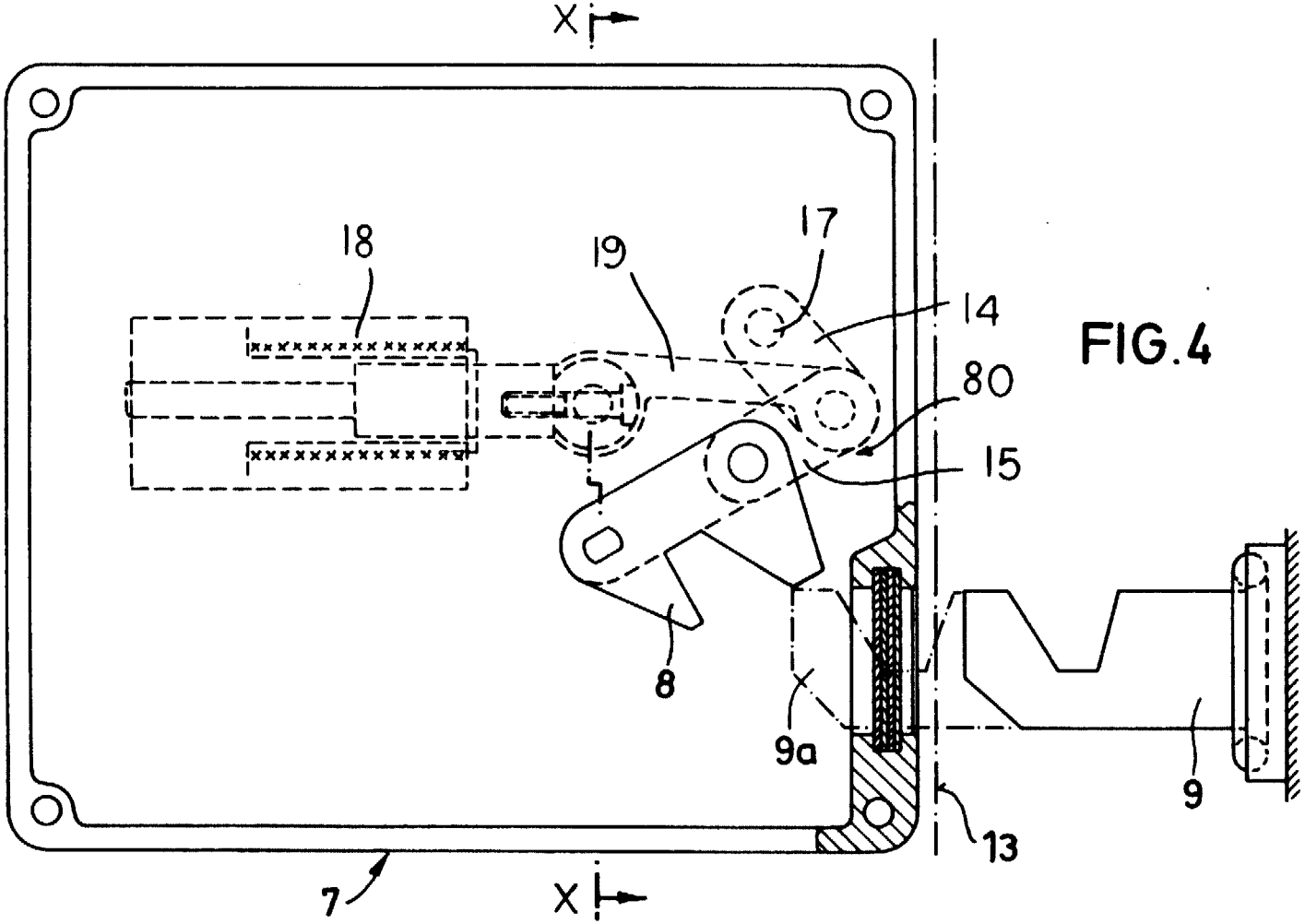
FIG. 4 is the safety interlocking device in accordance with FIG. 3, however in a released position.

FIG. 4 illustrates the housing 7 in the opened position in accordance with FIG. 3, whereby the toggle lever system 80 and the locking lever 8 are in the other dead center position, namely the opened position. The protective hood 5 and the actuating part 9 are also in the opened position. In comparison with the position in accordance with FIG. 3, the locking lever 8 has performed a pivot movement for reaching the dead center position in accordance with FIG. 4, which is also transmitted to the toggle lever system which is illustrated in dash lines, so that it is brought into the second dead center position. The operating current for the machine is interrupted in this second dead center position. The moment at which this second dead center position is reached is shown by the dash-dotted position of the actuating part which is designated with the reference numeral 9. The dash-dotted line 13 indicates the left front face end of the protective hood 5 at the illustrated full line drawn position of the actuating part 9, so that the protective hood 5 always covers the actuating part 9 to the outside. A further below discussed holding magnet is also illustrated in two positions by dash lines in FIGS. 3 and 4.

Figure 5:
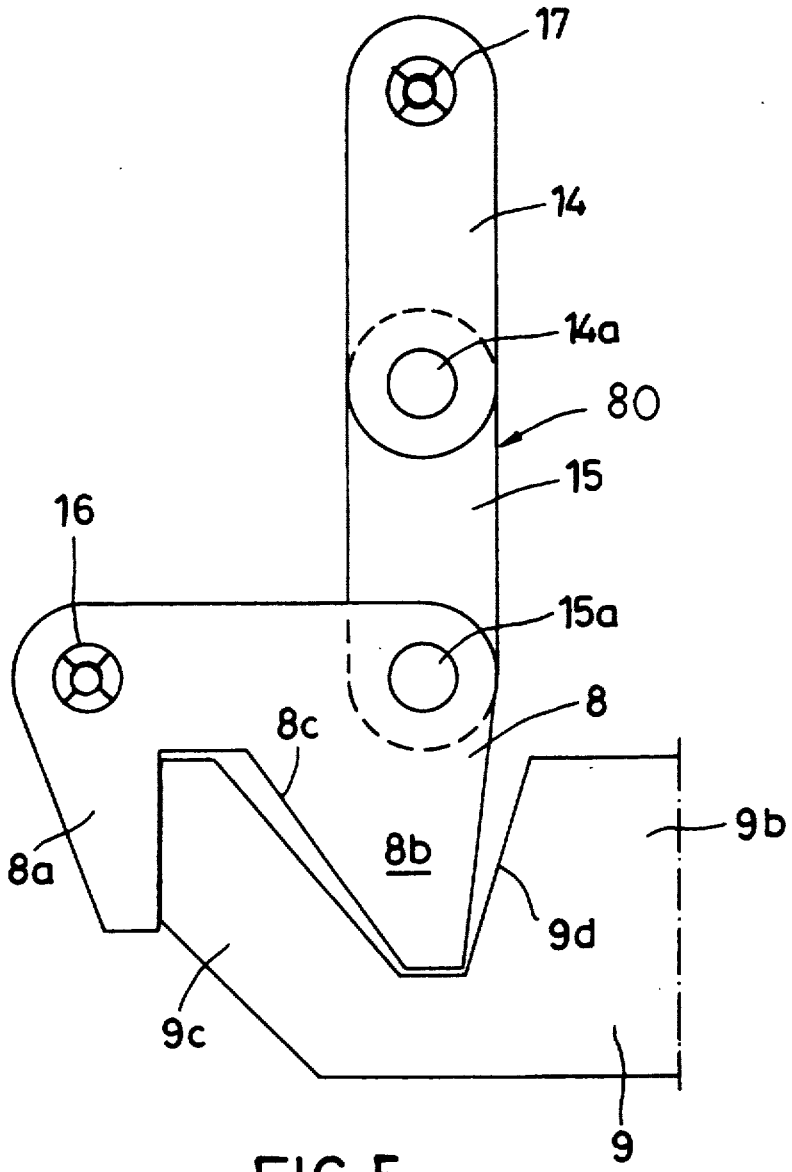
FIG. 5 is a detail from FIG. 3 on an enlarged scale in the locked position.
Figure 6:
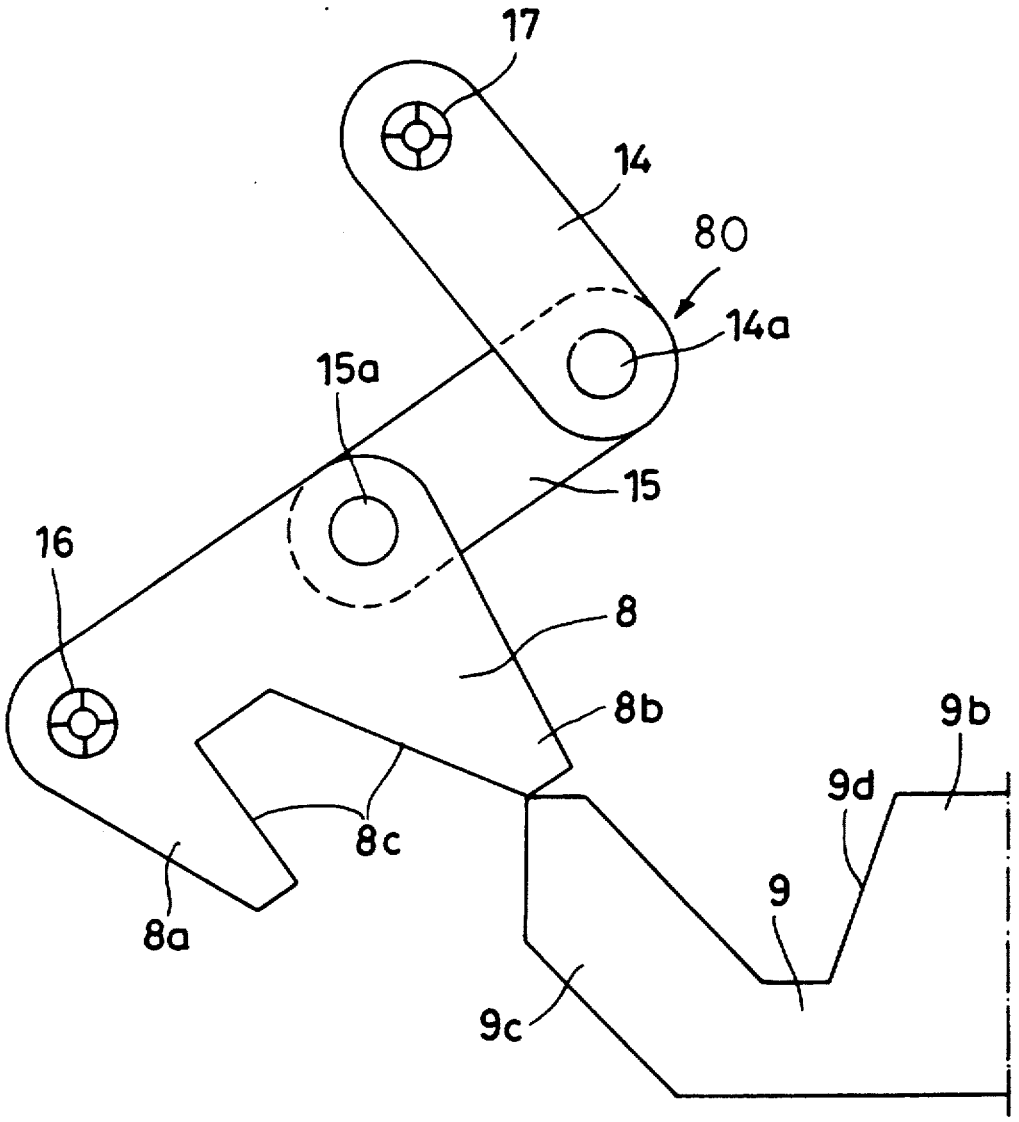
FIG. 6 is the detail in accordance with FIG. 5, however in a released position.

FIGS. 5 and 6 illustrate the toggle lever system 80 in the two dead center positions. The actual toggle lever of the toggle lever system consists of two levers 14 and 15 which are connected with each other by means of a center joint 14a. The one lever 14 positioned away from locking lever 8 is held on a stationary pivot bearing 17 at its outer end. The other lever 15 with the end positioned away from the center joint 14a is connected with the one end of locking lever 8 by means of a joint 15a. The other end of the locking lever 8 is held in a stationary pivot bearing 16. The locking lever 8 and the actuating part 9 are alternately provided with trapezoidal like protrusions 8a and 8b or 9b and 9c and recesses 8c or 9d which forcibly interlock by inserting the actuating lever 9, as illustrated in FIG. 5. In this one important dead center position in accordance with FIG. 5 the center points of the joints 14a and 15a as well as the pivot bearing 17 are disposed in one straight line. In this position the protrusion 8b of the locking lever 8 engages into the recess 9d of the actuating part 9, so that they are interlocked with each other. This dead center position in accordance with FIG. 5 corresponds to the dangerous operating condition of the machine. FIG. 6 illustrates the other dead center position of the toggle lever with the two levers 14 and 15 as well as the locking lever 8 with a drawn out actuating part 9. In this dead center position in which the protective hood 5, which is connected with the actuating part, can be opened, while the current interruption to the machine is forcibly and mechanically interlocked, i.e., in this dead center position the machine remains idle, so that a dangerous operating condition cannot occur. The pivot movement is performed around the stationary pivot bearings 16 and 17. In this aforementioned exemplified embodiment the mechanically actuated switching on and switching off of the operating current for the machine can be performed by suitably connected switches or other means.

Figure 7:
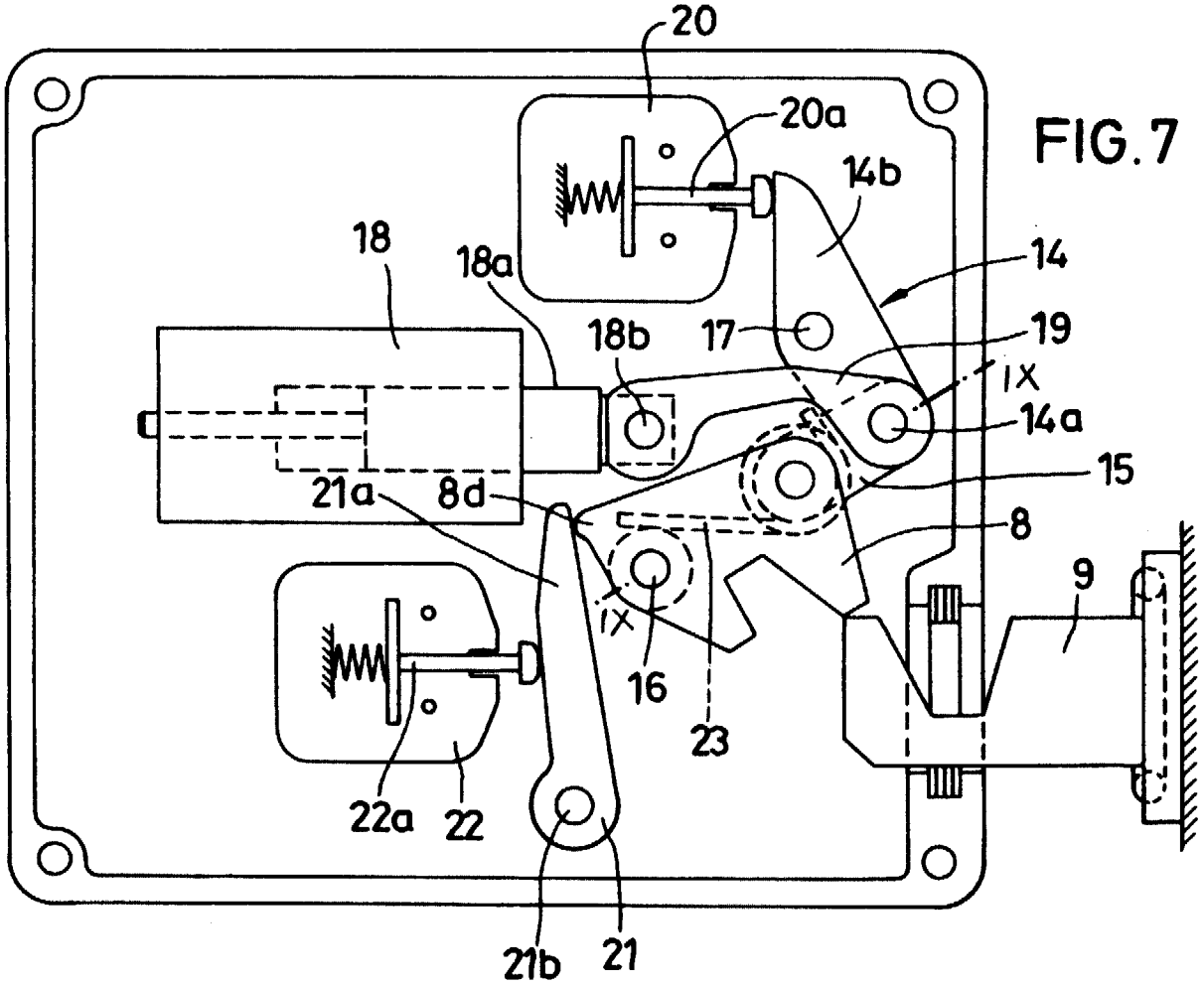
FIG. 7 is a safety interlocking device in accordance with FIG. 4 , however in another embodiment in a released position.
Figure 8:
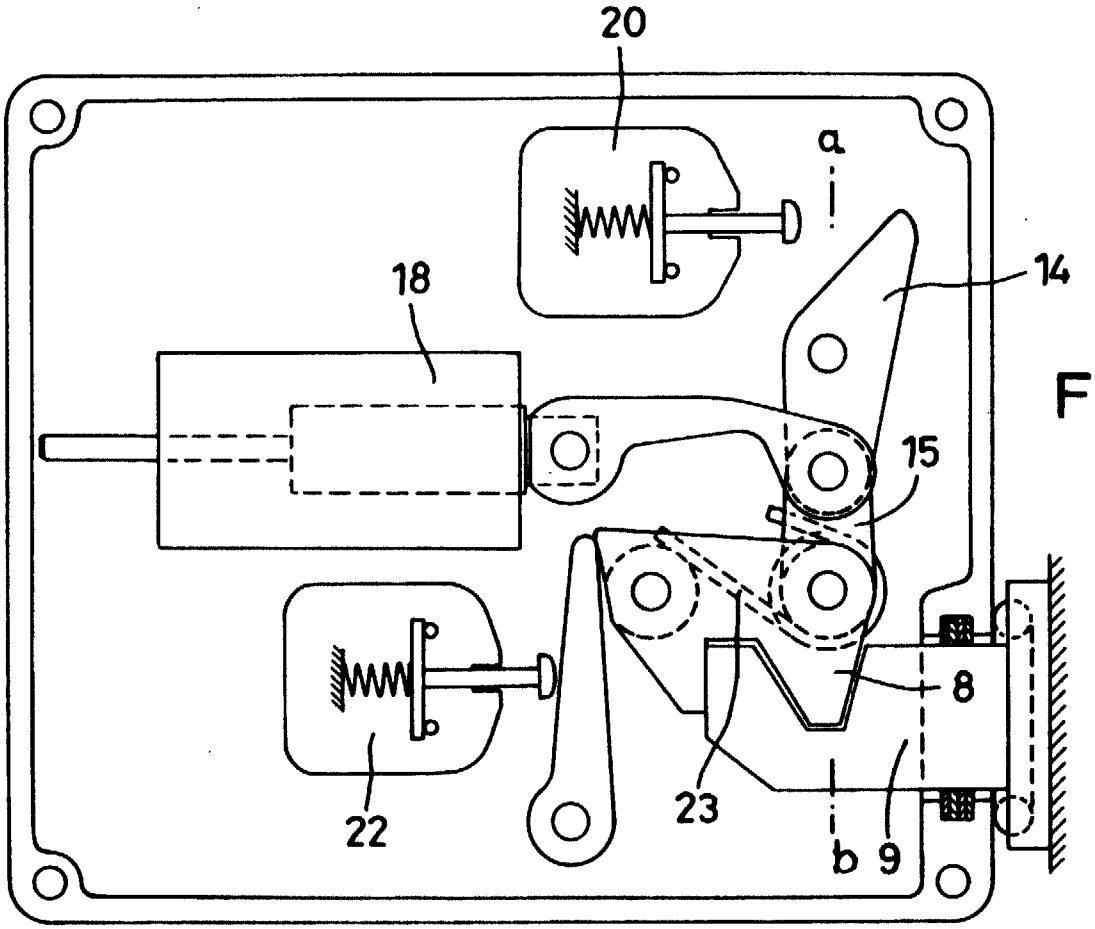
FIG. 8 is a view in accordance with FIG. 7, however, in a locked position.

FIGS. 7 and 8 illustrate a preferred exemplified embodiment of the safety interlocking device, whereby in this case the two dead center positions and the cooperation of the toggle lever system is illustrated with electrical switches 20 and 22 as well as a holding magnet 18. A pull lever 19 is pivotably mounted on the center joint 14a of the toggle lever which is connected with the anchor 18a of the holding magnet 18 by a further joint 18b. In this exemplified embodiment the one lever 14 is provided with an extension part 14b extending beyond the pivot bearing 17 which engages a plunger 20a of the electrical switch 20. Furthermore, the locking lever 8 is provided with an extension part 8d which extends beyond the pivot bearing 16 which engages on the outer end 21a of a switching lever 21 being supported in a pivot bearing 21b. The switching lever 21 cooperates with the plunger 22a of the further electrical switch 22, so that in the one dead center position of the toggle lever and the locking lever 8, in accordance with FIG. 7, the switches 20 and 22 are opened, the operating current is interrupted and the holding magnet 18 is without current. In the other dead center position in accordance with FIG. 8, the holding magnet 18 is switched on during the mechanical interlocking of locking lever 8 and the actuating part 9. In this position the holding magnet 18 holds the levers 14,15 of the toggle lever in this straight line dead center position. As illustrated, the switches 20 and 22 are switched on for the operating current. As FIG. 8 illustrates, the holding magnet 18 is in a pulling position i.e., the anchor 18a is displaced to the left in comparison with the position in accordance with FIG. 7, so that the holding magnet assures the dead center position in accordance with FIG. 8. The opening of the protective hood 5 is now no longer possible even if applying great force. For assuring the dead center position only very low forces are required, so that a small magnet is sufficient. This is particularly advantageous for the structural size of the total device. In a known manner, the control of the operating machine switches the current automatically off after the operating procedure is finished and the machine comes to a standstill. Thus, the holding magnet 18 is also without current. For operating the protective hood 5 the unsecured dead center position of levers 14 and 15 must be overcome. For this purpose, as well as for securing the dead center position, only a very low force is required, if it is applied in such a manner that it acts vertically with respect to the dash-dotted line a–d in FIG. 8. A light shank spring 23 is advantageously provided for this purpose, which is so tensioned by the pivoting executed by the locking lever 8 during the insertion of the actuating part 9 that in the dead center position in accordance with FIG. 8 it exerts a vertical pressure on lever 15, that is, vertically with respect to line a–b.

Figure 9:
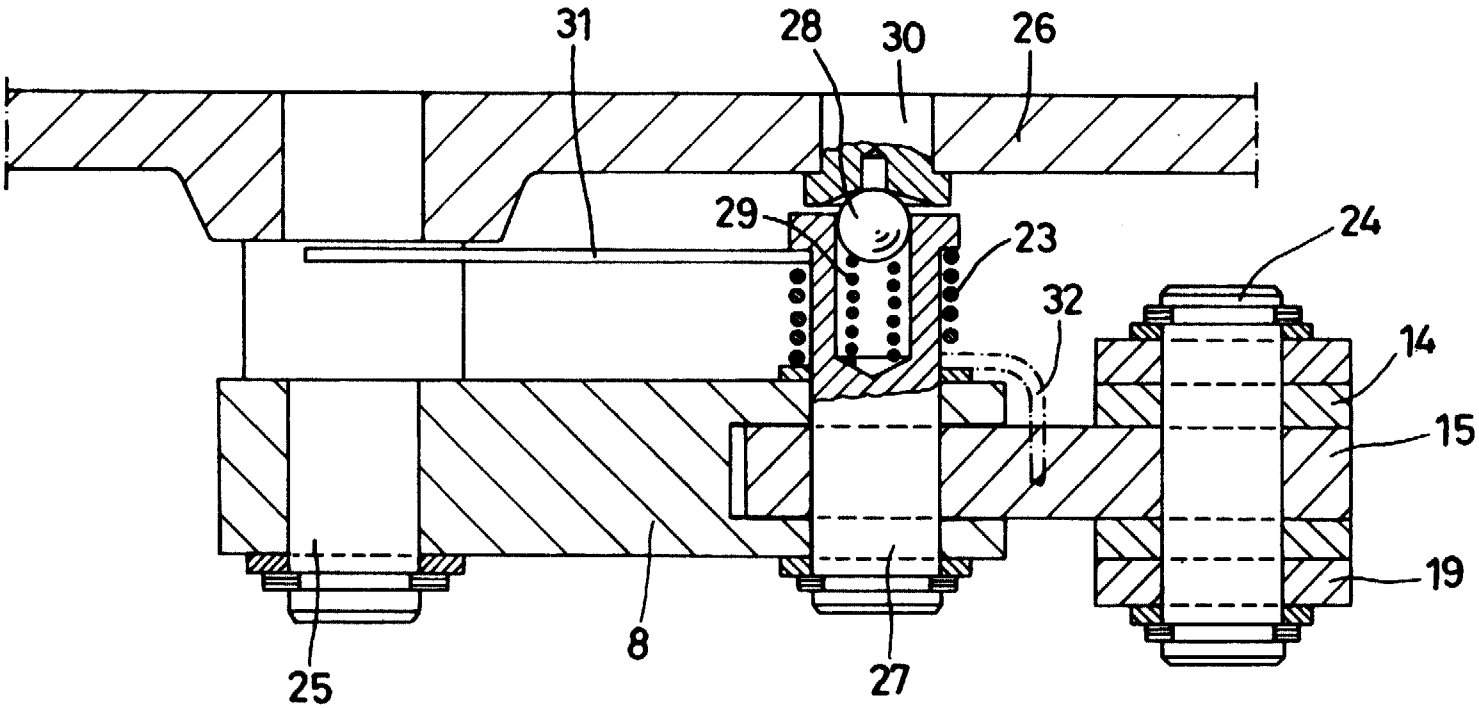
FIG. 9 is a section with respect to FIG. 7, in accordance with section line IX—IX in FIG. 7 on an enlarged scale.

FIG. 9 illustrates on an enlarged scale a section along sectional line IX—IX of FIG. 7. Accordingly, the center joint 14a is provided with a joint bolt 24 by which the levers 14 and 15 of the toggle lever system and the pull lever 19 are held together pivotably with respect to each other. The pivot bearing 16 of the locking lever 8 is provided with a position bolt 25 which is mounted on the inner wall 26 of housing 7. The locking lever 8 and the lever 15 of the toggle lever are pivotably connected with each other by means of a joint bolt 27. The joint bolt 27 is extended towards the inner wall 26 of housing 7. An axial bore is provided in the extension of bolt 27, in which a pressure spring 29 is inserted which pushes an engaging locking ball 28 to the outside. At one location of the inner ball 26, which corresponds to the dead center position for the non-dangerous operating condition in accordance with FIG. 7, a locking member 30 is provided with which the locking ball 28 engages during this dead center position. A shank spring 23 is disposed on the circumference of the extended part of the joint bolt 27, whose one shank end 31 supports on the position bolt 25 and whose other shank end 32 engages on lever 15. Therefore, the joint bolt 27 meets three tasks, namely it effects a moveable connection between locking lever 8 and lever 15, furthermore it effects the locking of the locking ball 28 in the locking recess 30 in the mentioned dead center position and finally it supports the shank spring 23, which can also be seen in FIGS. 7 and 8. The locking carried out by the locking member 30 and the locking ball 28 acts as an additional securing of the dead center position in accordance with FIG. 7, wherein the shank spring 23 does no longer pressure on lever 15. This locking achieves the same effect as that of hold magnet 18 in the dead center position in accordance with FIG. 8. Since the dead center position already affords sufficient safety due to the joint friction, only very low forces are required in both cases as an additional safety provided. The safety by the hold magnet 18 in accordance with FIG. 8 is preferred in this position over the locking safety in accordance with FIG. 7, because this is the dangerous operating position, whereby one must take into account vibrations. The safety by the hold magnet is more advantageous in this case, because it always corrects the slightest deviation from the dead center position automatically.

Figure 10:
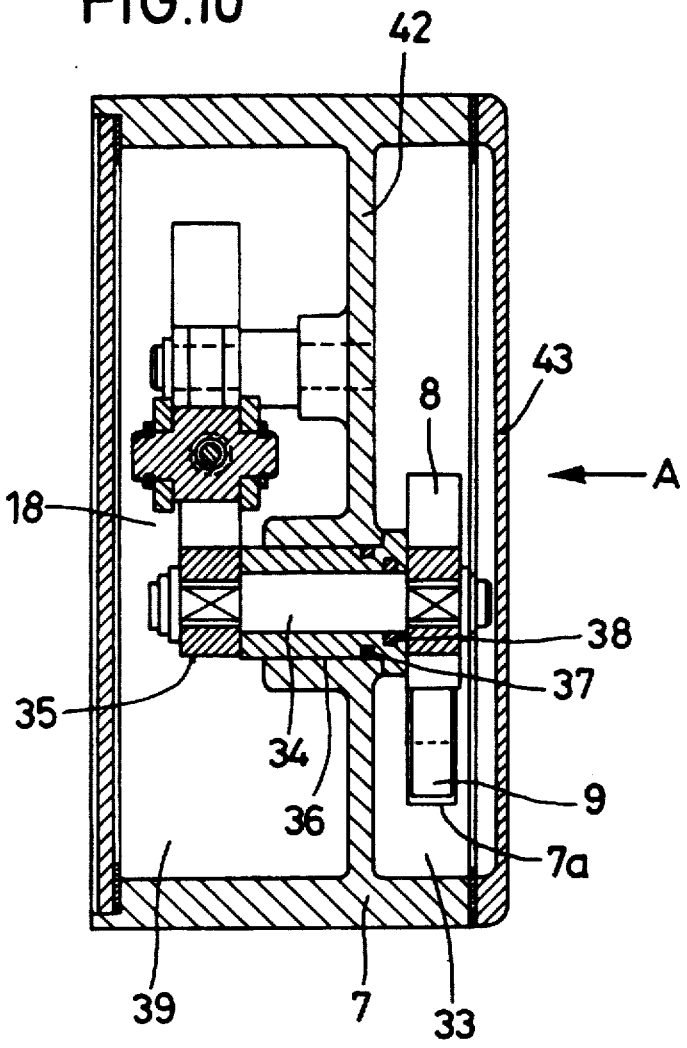
FIG. 10 a vertical section in accordance with section line X—X in FIG. 4.

FIG. 10 illustrates a particularly advantageous design of housing 7, namely in a section corresponding to sectional line 10—10 in FIG. 4. In this exemplified embodiment the housing 7 is separated into two chambers 33 and 39 by means of an intermediary wall 42 which extends vertically with respect to the plane of the drawing of FIG. 10 and parallel to a lid 43 of the housing. The one chamber 39 is defined for receiving the holding magnet 18, the switches 20 and 22 and the structural parts which are actuated by them and is completely sealed from the outside. In the other chamber 33 the locking lever 8 is mounted on a shaft 34 which extends into the sealed chamber 39 by means of an intermediate positioning of a bearing bushing 36 and packings 37 and 38 and also extends through the intermediary weall 42. The shaft 34 cooperates with a lever 35, which transmits the pivot movement of the locking lever 8 to the toggle lever system. Advantageously, the chamber 33 is also substantially closed and not accessible from the outside. As already explained with respect to FIG. 3, only the insertion opening 7a for the actuating part 9 is provided.

The separation of the housing 7 into two chambers illustrated in FIG. 10 is required if the described parts of the safety interlocking device should be protected from liquid, in particular aggessive cooling agents or from strong dust action. This is particularly true for all electrical devices, i.e., for the holding magnet 18 and the electrical switches.

In the exemplified embodiment in accordance with FIG. 10 the actuating part 9 can be inserted into chamber 33 during the closing of protective hood 5, where the locking lever 8 is actuated as described. As already desrcibed with respect to FIG. 3, the insertion opening is also protected against impurities by a wipe off packing 10 and a seal 12, which is sufficient protection during dry operation and in clean rooms. It also is recommended to mount the locking lever 8 on the shaft 34 by means of a multi-edged mounting device.

Figure 11:
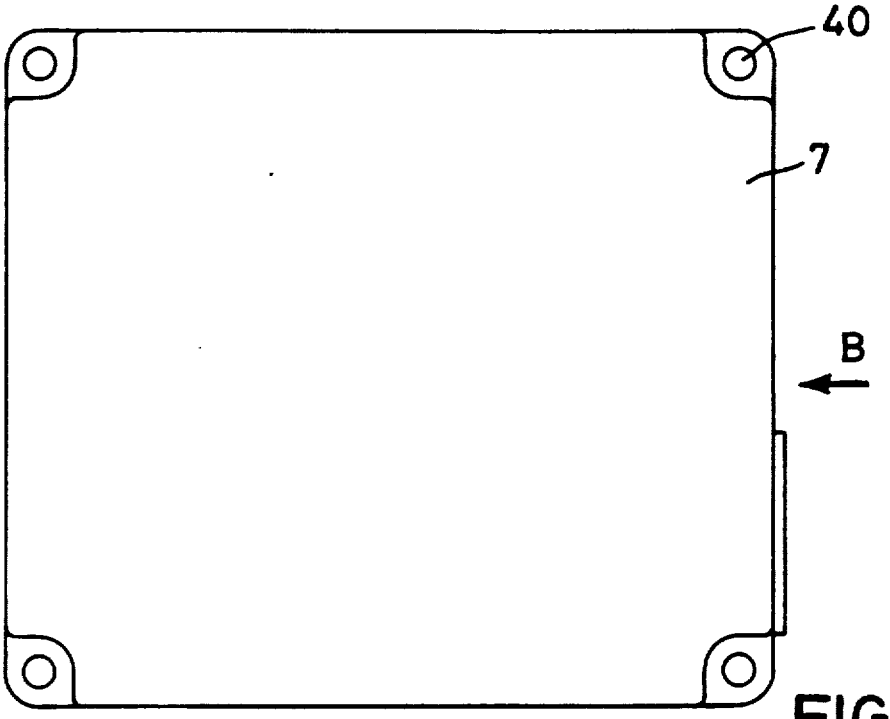
FIG. 11 is a plan view of the closed housing of a safety interlocking device in accordance with the arrow A in FIG. 10; and, FIG. 12 is a side view thereto in accordance with arrow B in FIG. 11.

FIG. 11 represents the front view of the closed housing 7 in the direction of arrow A in accordance with FIG. 10. It further illustrates the type of mounting by four screw holes 40, so that the housing 7 can be mounted at a suitable location on the machine frame, for example.

Figure 12:
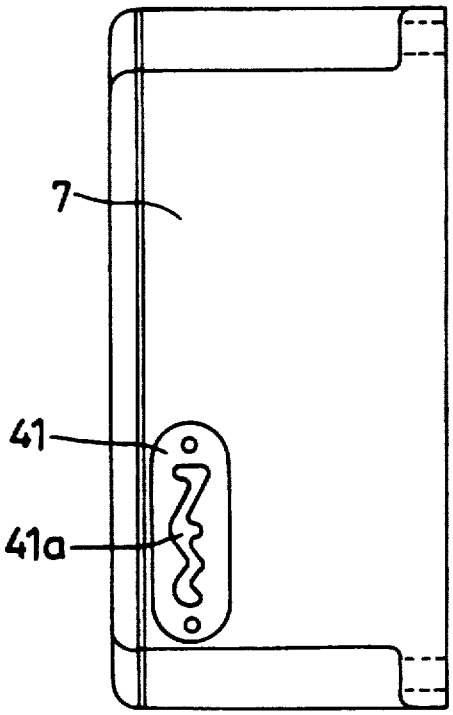

FIG. 12 is the side view of housing 7 in accordance with arrow B in FIG. 11. A flange 41 is rigidly mounted at the insertion opening of the housing for the actuating part 9, which is provided with a sheet metal like lockup or a serrated opening 41a. The cross section of the actuating part 9 is adapted in its shape to this opening. Due to this type of design of the insertion opening or the flange 41 and the actuating part 9 the actuation of the locking lever 8 from the outside in an unauthorized manner, for example, by means of a screw driver is prevented.

It will be understood that each of the elements described above, or two or more together, may also find a useful application in other types of safety interlocking devices differing from the type described above.

While the invention has been illustrated and described as embodied in a safety interlocking device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly consitute essential characteristics of the generic or specific aspects of this invention.

What is claimed as new and desired to be protected by Letters Patent is set forth in the appended claims:

1. Safety [interlock switching device] *lock* for [protecting]*preventing access to hazardous* equipment, in particular [in] current conducting equipment, [wherein] *provided with* a [given protection] *protective* device [(5),] normally closed during [dangerous operation] *a hazardous operating* condition and opened during [non-dangerous] *a non-hazardous* operating condition, [the switching device] *said lock* comprising: a housing [,] *adapted to be mounted on said equipment and provided with an insertion opening;* a toggle lever [(14,15) provided] *including first and second elongate members pivotably connected to each other and cooperating* with a pivotable locking lever [(8)], *said elongate members being pivotably connected to said housing and to said locking lever, respectively, for movement* [pivotable] between [two] *first and second* dead center positions *,said locking lever being provided with first locking means and being pivotably mounted on said housing in a position accessible through said insertion opening*; an actuating element [(9) stationarily] *provided with second locking means and adapted to be* mounted on said [protection] *protective* device, *for movement therewith into and out of said insertion opening to cooperate with* [,] said locking lever; [cooperating with said actuating element,] switch means [connected to and] cooperating with *and responsive to the movement of* said toggle lever[,]*;said first and second locking means* [said actuating element and said locking lever being provided with locking means] cooperating with each other so that in [one] *said first* dead center position [of the toggle lever (14,15) the locking lever (8) and the actuating element (9)] *they* interlock [with each other] and [the] *said hazardous*[dangerous] operating condition may be switched on by said switch means and in the [other] *second* dead center position [the dangerous]*they are released and said hazardous* operating condition is switched off by said switch means [thus releasing the actuating element (9) and the protection device (5) therewith, said toggle lever and said switch means being disposed in said housing which is closed and is not accessible from the outside, said housing being provided with an insertion opening for inserting the actuating element (9) into said housing].

2. [Device] *The lock* in accordance with claim 1, wherein *said first and second locking means comprises alternating complementary trapezoidal protrusions in said* [the] locking lever [(8)] and [the] *said* actuating element [(9) are alternately provided with trapezoidal protrusions (8a,8b; 9b,9c) and recesses (8c;9d) which consitute said locking means and said prot and recesses intermeshing] *adapted to mesh* with each other when [the] *said* actuating element [(9)] is inserted in said housing [so that the] *through said insertion opening, whereby said* toggle lever [(14,15)] is [brought] *moved* into [the one] *said first* dead center position corresponding to the [dangerous] *hazardous* operating condition and interlocks [the] *with said* locking lever [(8)].

3. [Device] *The lock* in accordance with claim 2, wherein [the] *said elongate members* [of said toggle lever consists of two levers (14,15) which] are *at one of their ends* connected with each other by a center joint, [(14a), one (14) of said levers facing away] *the elongate member remote* from [the] *said* locking lever [(8)] being [held on] *at its other end connected to said housing by* a *first* stationary pivot bearing [(17) at its one end], the other [(15) of said levers] *elongate member* having [one] *its other* end connected with [the] *said* locking lever [(8)] by a joint [(15a)], *the end of* said locking lever [(8) being held at an end thereof which faces away] *remote* from [the] said other [of said levers,] *elongate member being pivotably connected to said housing by* [on] a *second* stationary pivot bearing (16).

4. [Device] *The lock* in accordance with claim 3, further [including] *comprising* a pull lever [(19)] *having one end* pivotably [mounted on the] *connected to said* center joint [(14a), a holding magnet (18)] *and an electromagnet* having an anchor [(18a),] *connected* to *another end of* said pull lever [being connected with the anchor (18a) of the holding magnet (18) by a joint (18b)].

5. [Device] *The lock* in accordance with claim 4, wherein said switch means [include an] *comprises a first* electrical switch [(20)] having a plunger [(20a)] *engageable with an extension of said one elongate member extending beyond said first stationary pivot bearing* and a second electrical switch [(22)] having a plunger [(22a), and] *cooperating with* a pivotable switch lever [(21) held in] *mounted on* a pivot bearing [(21b), said one lever (14) being provided with an extension part (14b) extending beyond the pivot bearing (17) and engaging the plunger (20a) of the electrical switch (20),] *and by an outer end engaging an extension of said* [the] locking lever [(8) being provided with an extension part (8d)] extending beyond [the] *said second stationary* pivot bearing [(16) and engaging on an outer end (21a) of the switch lever (21), said switch lever (21) cooperating with the plunger (22a) of the electrical switch (22)], so that in [the one] *said second* dead center position [of the toggle lever (14,15) the] *said first and second electrical* switches [(20,22)] are opened[, an] *to interrupt* operating current [is interrupted and the holing magnet (18) has no current]*in the electromagnet,* while in the [other] *first* dead center position in which the locking lever [(8)] and the actuating element [(9)] interlock [with each other, the holding magnet (18) is] *said first and second switches are* switched on *to energize said electromagnet with current to hold* [and holds the] *said* toggle lever [(14,15)] in [the other]*said first* dead center position[, and the switches (20,22) are switched on for an operating current].

6. [Device] *The lock* in accordance with claim 5, wherein a joint bolt [(24)] is provided [, which is positioned] in [the] *said* center joint [(14), said levers (14,15) of the toggle lever and the] *for pivotably holding said* pull lever [(19) being held] *and said elongate members* together [with said bolt in a pivotal movement toward each other], [the] *and wherein said second stationary* pivot bearing [(16) of the locking lever (8) being] *is* provided with a position bolt [(25)] mounted on an inner wall [(26)]of [the] *said* housing [(7), and the] *said* locking lever [(8)]and [the one lever (15) of the toggle lever] *said other elongate member* being pivotably connected [with each other] by a *further* joint bolt [(27)].

7. [Device] *The lock* in accordance with claim 6, wherein [the] *said further* joint bolt (27) is [extended] *extending* toward [the] *said* inner wall [(26) of the housing (7) and has] *and is provided with* an axial bore[,] *for supporting* a pressure spring [(29) being supported in said axial bore, and said joint bolt further] including a locking ball [(28)], said [housing having] *inner wall being provided with* a [locking] *recess* member [30 cooperating with] *for releasably retaining* said locking ball [in accordance with the] *when said toggle lever is in said second* dead center position [corresponding to the non-dangerous operating condition], said *further joint* bolt (27) further supporting on a circumference thereof a shank spring [(23)] having one shank end [(31) which is] positioned on [the] *said* position bolt [(25)] and [the other] *another* shank end [(32) which engages on the lever (15)] *engaging said second elongate member.*

8. [Device] *The lock* in accordance with claim 7, wherein [the] *said* housing [(7)] is separated into two discrete chambers [(33,39)], one of said chambers [(39)] *receiving said electromagnet and* being [defined to receive] *sealed* [said holding magnet (18) said one chamber being sealed from the outside], [a shaft (34) being supported in] the other [(33)] of said chambers [, the] *being provided with said insertion opening and housing said* locking lever [(8) being] mounted on [said shaft (34), said] *a* shaft extending [into the sealed chamber (39)] *between said two chambers* via a *sealed* bearing bushing [(36) and being sealed in said bushing by a sealing [(37,38)], and cooperating with [a lever (35) which transmits the pivot] *said other elongate member for transmitting the pivotal* movement of [the] *said* locking lever [(8)]to [the] *said* toggle lever [, the other chamber (33) being provided with the insertion opening for the actuating element (9)].

9. [Device] *The lock* in accordance with claim 1, wherein [the] *said* actuating element [(9)] is connected [with the protection] *to said protective* device [(5)] by a flange [(11) having] *provided with* a recess [, and] *containing* a packing [(12) is provided in the recess of this flange].

10. [Device] *The lock* in accordance with claim 9, wherein a flange [(41)] *formed of a sheet metal and having a serrated opening* [(41a),] is rigidly mounted on the insertion opening of said housing [(7), said flange being and], said actuating element [(9)] having a cross-section corresponding to said *serrated* opening.

11. [Device] *The lock* in accordance with claim 1, wherein said insertion opening [has a wipe of] *is provided with a wiper* packing [(10) inserted in a wall of said housing] *for cleaning said actuating element.*

*12. Apparatus for controlling the operating condition of hazardous equipment having first and second protective cover means mounted for movement relative to each other between open and closed positions, and for selectively interlocking said first and second cover means in said closed position, said apparatus comprising:*

*an actuating bolt provided with locking means and mounted on said first cover means to extend behind said second cover means when in said closed position;*

*a housing mounted on said second cover means and provided with an insertion opening;*

*means mounted in said housing and accessible through said insertion opening for cooperating with said locking means, comprising elongate latch means mounted at one of its ends for pivotable movement between a first position in which it engages said locking means of said actuating bolt thereby interlocking said first and second cover means, and a second position out of engagement with said locking means to allow movement of said first and second cover means to their open position;*

*toggle lever means comprising first and second link means joined at one of their ends for movement between first and second dead center positions, said first link means being pivotably mounted at its other end to said housing and said second link means having its other end pivotably connected to the other end of said latch means;*

*electromagnetic means comprising means movable between first and second positions and joined to said links at their one end;*

*switch means responsive to movement of said toggle lever means between its first and second dead center positions for respectively energizing and deenergizing said electromagnetic means and said hazardous equipment.*

*13. The apparatus of claim 12, wherein said locking means comprises a recess of trapezoidal configuration and extending radially into said actuating bolt and said latch means is provided with a protrusion complementing said recess.*

*14. The apparatus of claim 12, further including wall means for dividing said housing into two discrete chambers, said electromagnetic means, said switch means, and said toggle lever means being provided in one of said chambers, said other end of said second link means being connected to a shaft journalled in said wall means.*

*15. The apparatus of claim 14, wherein said insertion opening and said latch means is provided in the other of said chambers and connected to said other end of said second link means by said shaft journalled in said wall.*

*16. The apparatus of claim 12, wherein said insertion opening is formed of a flange made of sheet metal and is of serrated configuration and said actuating bolt has a cross-section complementary to said serrated configuration.*

*17. The apparatus of claim 16, wherein said insertion opening is provided with a wiping packing.*

*18. The apparatus of claim 12, wherein said electromagnetic means comprises anchor means provided with a pull lever connected to said toggle lever by said one ends of said first and second link means.*

*19. The apparatus of claim 12, wherein said switch means is adapted to energize said electromagnetic means and said hazardous equipment when said latch means is in its first position.*

* * * * *